(12) United States Patent
Subbotin et al.

(10) Patent No.: US 9,312,698 B2
(45) Date of Patent: Apr. 12, 2016

(54) SYSTEM AND METHOD FOR ENERGY DISTRIBUTION

(71) Applicant: Robert Bosch GmbH, Stuttgart (DE)

(72) Inventors: Maksim V. Subbotin, San Carlos, CA (US); Binayak Roy, Mountain View, CA (US); Ashish S. Krupadanam, Cupertino, CA (US); Jasim Ahmed, Mountain View, CA (US)

(73) Assignee: Robert Bosch GmbH, Stuttgart (DE)

( * ) Notice: Subject to any disclaimer, the term of this patent is extended or adjusted under 35 U.S.C. 154(b) by 480 days.

(21) Appl. No.: 13/719,548

(22) Filed: Dec. 19, 2012

(65) Prior Publication Data

US 2014/0172182 A1    Jun. 19, 2014

(51) Int. Cl.
*H02J 3/00* (2006.01)
*H02J 3/38* (2006.01)
*H02J 7/35* (2006.01)

(52) U.S. Cl.
CPC . *H02J 3/383* (2013.01); *H02J 7/35* (2013.01); *H02J 2003/003* (2013.01); *Y02E 10/54* (2013.01); *Y02E 10/563* (2013.01); *Y02E 10/566* (2013.01); *Y02E 10/763* (2013.01); *Y02E 10/766* (2013.01)

(58) Field of Classification Search
None
See application file for complete search history.

(56) References Cited

U.S. PATENT DOCUMENTS

| | | | |
|---|---|---|---|
| 5,225,712 A | 7/1993 | Erdman | |
| 6,055,163 A | 4/2000 | Wagner et al. | |
| 6,577,962 B1 * | 6/2003 | Afshari | 702/61 |
| 6,785,592 B1 | 8/2004 | Smith et al. | |
| 7,469,541 B1 * | 12/2008 | Melton et al. | 60/641.1 |
| 7,696,642 B2 * | 4/2010 | Wakitani et al. | 307/65 |
| 7,844,370 B2 | 11/2010 | Pollack et al. | |
| 8,019,697 B2 | 9/2011 | Ozog | |
| 8,095,245 B1 | 1/2012 | Mannepalli et al. | |
| 8,364,609 B2 | 1/2013 | Ozog | |
| 8,694,176 B2 * | 4/2014 | Yamamoto et al. | 700/297 |
| 8,774,976 B2 * | 7/2014 | Mansfield | 700/291 |
| 8,862,279 B2 * | 10/2014 | Darden et al. | 700/291 |
| 8,965,590 B2 * | 2/2015 | Boardman et al. | 700/289 |
| 8,972,070 B2 * | 3/2015 | Sun et al. | 700/291 |

(Continued)

FOREIGN PATENT DOCUMENTS

| | | |
|---|---|---|
| DE | 102012202465 A1 | 8/2012 |
| JP | 2011027376 A | 2/2011 |

(Continued)

OTHER PUBLICATIONS

Stluka, Petr, "Energy Management Solutions for Campuses," Honeywell, Engineering Fellow, Lisbon, Nov. 11, 2010, pp. 2-16.

(Continued)

*Primary Examiner* — Christopher E Everett
(74) *Attorney, Agent, or Firm* — Maginot Moore & Beck LLP

(57) ABSTRACT

A system and method for controlling the distribution of energy from a plurality of energy resources to a load. The system includes an energy system controller to control the distribution of energy to an electric load provided by a plurality of energy resources. The energy resources include dispatchable sources of energy such as diesel generators and combined heat and power generators; renewable sources of energy including photo-voltaic cells, wind turbines, and geothermal sources; and storage resources such as electrochemical batteries or pumped hydro reserves.

22 Claims, 3 Drawing Sheets

(56) References Cited

U.S. PATENT DOCUMENTS

| | | |
|---|---|---|
| 2002/0029097 A1 | 3/2002 | Pionzio, Jr. et al. |
| 2005/0039787 A1 | 2/2005 | Bing |
| 2005/0127680 A1 | 6/2005 | Lof et al. |
| 2005/0234600 A1 | 10/2005 | Boucher et al. |
| 2006/0161310 A1* | 7/2006 | Lal .................. 700/295 |
| 2008/0039979 A1 | 2/2008 | Bridges et al. |
| 2009/0043519 A1 | 2/2009 | Bridges et al. |
| 2009/0216387 A1* | 8/2009 | Klein ................ 700/296 |
| 2010/0179704 A1* | 7/2010 | Ozog ................ 700/291 |
| 2010/0198421 A1 | 8/2010 | Fahimi et al. |
| 2010/0217550 A1 | 8/2010 | Crabtree et al. |
| 2011/0015799 A1 | 1/2011 | Pollack et al. |
| 2011/0035070 A1* | 2/2011 | Kanai ................ 700/288 |
| 2011/0040550 A1 | 2/2011 | Graber et al. |
| 2011/0231028 A1* | 9/2011 | Ozog ................ 700/291 |
| 2011/0276269 A1* | 11/2011 | Hummel ................ 702/3 |
| 2011/0276527 A1* | 11/2011 | Pitcher et al. .......... 706/21 |
| 2011/0282514 A1* | 11/2011 | Ropp et al. ........... 700/297 |
| 2011/0307110 A1 | 12/2011 | Sharma et al. |
| 2012/0053739 A1* | 3/2012 | Brian et al. .......... 700/287 |
| 2012/0072039 A1* | 3/2012 | Anderson et al. ...... 700/291 |
| 2013/0144451 A1* | 6/2013 | Kumar et al. ......... 700/291 |
| 2013/0179061 A1* | 7/2013 | Gadh et al. .......... 701/123 |
| 2013/0190940 A1* | 7/2013 | Sloop et al. .......... 700/291 |
| 2013/0261823 A1* | 10/2013 | Krok et al. .......... 700/291 |
| 2014/0129040 A1* | 5/2014 | Emadi et al. ......... 700/291 |

FOREIGN PATENT DOCUMENTS

| | | |
|---|---|---|
| JP | 2013027285 A | 2/2013 |
| WO | 2012145563 A1 | 10/2012 |

OTHER PUBLICATIONS

International Search Report and Written Opinion corresponding to PCT Application No. PCT/US2014/028077, mailed Jul. 9, 2014 (10 pages).

International Search Report and Written Opinion corresponding to PCT Application No. PCT/US2013/076567, mailed Jan. 21, 2015 (12 pages).

* cited by examiner

SYSTEM AND METHOD FOR ENERGY DISTRIBUTION

FIELD

The present invention relates to an energy distribution system, and more particularly to an energy distribution system architecture to control the distribution of energy to a system load.

BACKGROUND

Existing energy system architectures can include a logic-based controller implementing simple control logic to dispatch energy from an energy storage device, such as electrochemical batteries, to a load. The logic-based controller includes a predetermined set of thresholds and time stamps that define when a given energy storage device stores energy or is charged from available resources and when the storage device releases energy to a load. Examples of such logic-based controllers include load following controllers and cycle-charging controllers. With a load-following controller, the storage device is charged with energy provided by renewable resources when the energy is available and is discharged during a specified time of the day or when the load exceeds a specified threshold. With a cycle-charging controller, the storage device is charged when a dispatchable resource, such as a diesel generator, is running while also providing power to the load, and is discharged similarly to the load-following strategy.

While logic-based control systems provide for the integration of energy storage devices into energy systems and can provide a certain amount of functionality, the logic-based control system can be deficient when attempting to recover the energy that has been stored and the economic benefits that can be provided by the energy storage system.

SUMMARY

In accordance with one embodiment of the present disclosure, there is provided an energy control system configured to control the transmission of energy to an electrical load. The energy control system includes a renewable energy resource, a stored energy resource, a memory configured to store program instructions, and an energy system controller operably coupled to the renewable energy resource, to the stored energy resource, and to the memory. The energy system controller is configured to execute the stored program instructions to predict an energy requirement of the load over a long time horizon, predict energy to be generated by the renewable energy resource over the long time horizon, predict energy capacity stored in the stored energy resource over the long time horizon, and generate optimally planned power profiles for the renewable energy resource and the stored energy resource. The controller also executes the stored program instructions to compare the predicted energy requirement, the predicted energy generation, and the predicted energy capacity to an actual energy requirement of the load, an actual energy generation by the renewable energy resource, and an actual energy capacity in the stored energy resource over a short time horizon, and controls the supply of energy to the electrical load based upon the comparison.

In another embodiment, there is provided a method for controlling the transmission of energy between an electrical load, a renewable energy resource, and a stored energy resource. The method includes the steps of predicting an energy requirement of the load over a long time horizon, predicting energy to be generated by the renewable energy resource over the long time horizon, predicting energy capacity stored in the stored energy resource over the long time horizon, generating optimally planned power profiles for each of the resources in the energy system on the long time horizon, comparing the predicted energy requirement, the predicted energy generation, and the predicted energy capacity to an actual energy requirement of the load, an actual energy generation by the renewable energy resource, and an actual energy capacity in the stored energy resource over a short time horizon, and controlling the supply of energy to the electrical load based upon the comparison.

DESCRIPTION

Figure 1:
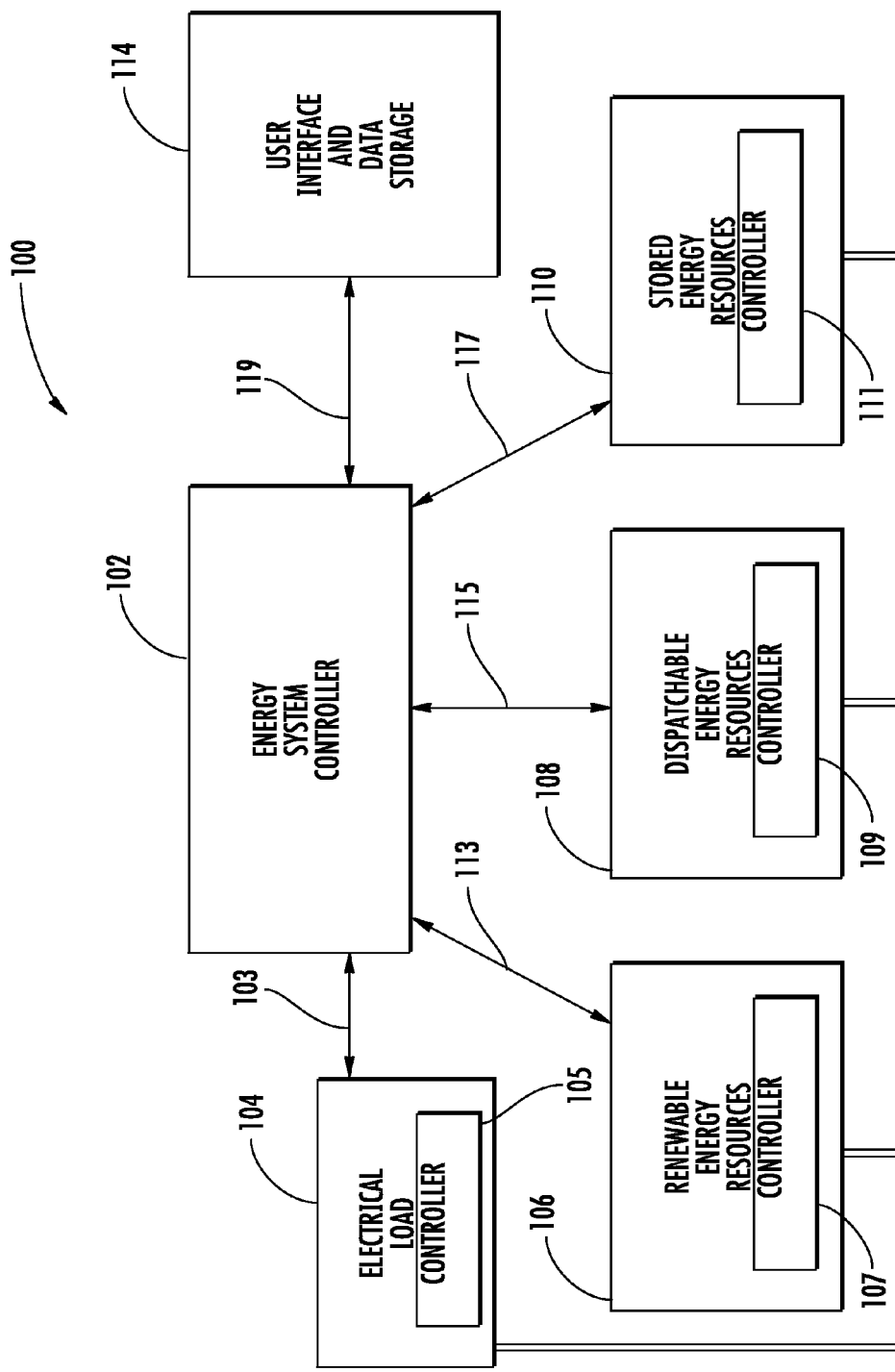
FIG. 1 is schematic block diagram of an energy system of the present invention.

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one of ordinary skill in the art to which this invention pertains.

FIG. 1 illustrates an energy system 100 that maximizes benefits of an energy system having one or more integrated energy resources. The energy system 100 includes an energy system controller 102 operatively coupled to an electrical load 104, through a communications line 103, which in one embodiment includes one or more electrical loads. The energy system controller 102 is also operatively coupled to one or more energy resources, including renewable energy resources 106 through a communications line 113, dispatchable energy resources 108 through a communications line 115, and stored energy resources 110 through a communications line 117. The electrical load 104, the renewable energy resources 106, the dispatchable energy resources 108, and the stored energy resources 110 are each operatively coupled to a power line 112 which provides for the transmission of energy from one or more of the energy resources to another energy resource and to the electrical load 104. A user interface, or human machine interface (HMI), and a data storage device 114 are also operatively coupled to the energy system controller 102 through a communications line 119. The communications lines 103, 113, 115, 117, and 119 are either hardwired or wireless or a combination thereof.

The energy system controller 102 integrates a plurality of components, devices or subsystems that provide for the prediction of energy generation, the planning of energy delivery and storage, and the selective transmission or delivery of power from an energy generation device or an energy storage device to a load or an energy generation device. When the components, devices or subsystems are integrated into a single control system, the flow of energy is seamlessly delivered between the load, energy storage devices, dispatchable energy resources, and renewable resources to the benefit of the user. The controller 102 is operatively coupled to a controller 105 of the electrical load 104, a controller 107 of the renewable energy resources 106, a controller 109 of the dispatchable energy resources 108, and a controller 111 of the stored energy resources 110. Each of the controllers, 105, 107, 109, and 111 in different embodiments, include processors and memories and receive and provide information in the form of signals to and from the controller 102. In addition, the controllers 105, 107, 109, and 111 in different embodiments include control hardware, including switching devices to provide for the generation and transmission of energy or the storage of energy within the energy system 100. The energy system 102 obtains status information from each of the resources 106, 108, and 110 as described later and also provides control signals to the controllers 105, 107, 109, and 111 for the generation and transmission or storage of energy in the system 100. The controller 102 is also operatively coupled to the controller 105 to receive status information of the load 104 indicative of the energy required by the load.

The controller 102 in different embodiments includes a computer, computer system, or programmable device, e.g., multi-user or single-user computers, desktop computers, portable computers and other computing devices. The controller 102 includes one or more individual controllers as described below and includes in different embodiments at least one processor coupled to a memory. The controller 102 includes in different embodiments one or more processors (e.g. microprocessors), and the memory in different embodiments includes random access memory (RAM) devices comprising the main memory storage of the controller 102, as well as any supplemental levels of memory, e.g., cache memories, non-volatile or backup memories (e.g. programmable or flash memories), read-only memories, etc. In addition, the memory in one embodiment includes a memory storage physically located elsewhere from the processing devices and includes any cache memory in a processing device, as well as any storage capacity used as a virtual memory, e.g., as stored on a mass storage device or another computer coupled to controller 102 via a network. The mass storage device in one embodiment includes a cache or other dataspace including databases.

The stored energy resources 110, in different embodiments, includes energy storage devices, such as electrochemical batteries such as those found in energy systems that supply electrical energy to residential loads, commercial loads or other types of loads and pumped hydro reserves. Utilization of the energy storage devices provides benefits in energy-savings by reducing the requirements for a distribution infrastructure and for integrating renewable energy resources into the electrical grid. Unlike conventional dispatchable resources which require a balance between the amount of energy generated and consumed by a grid at any instant of time, one or more storage devices enable the shifting of electrical energy consumption and energy generation from one period of time to another period of time. As a consequence, the energy generated by one or more renewable resources 106 which exceeds the amount of energy required by a given load at a certain time to satisfy energy demand, in one embodiment, is stored in the energy storage resources 110. Renewable energy resources include wind turbines, solar panels, biomass plants, hydroelectric power plants, geothermal power installations, tidal power installations, and wave power installations. In addition low cost energy which is provided by the electrical grid at a low price during periods of low demand by the load 104 is also being stored. The stored energy is then being provided on demand when energy is required or when other forms of energy are more expensive. Dispatchable energy resources also include hydro-power, coal power, diesel generators, electrical grid connection, and gas power.

The use of energy storage resources 110 also provides a reliable supply of electrical power to maximize the benefits provided to owners, managers, or users of the energy system 100. Consequently, the described system and method for energy distribution including the energy system controller 102 realize the benefits of an energy storage system represented, for example, by a battery installation, while providing a reliable source of energy that satisfies load demand at substantially any and at all times. The energy system controller 102 is configured to plan for the optimal operation of many different types and configurations of energy systems.

Figure 2:
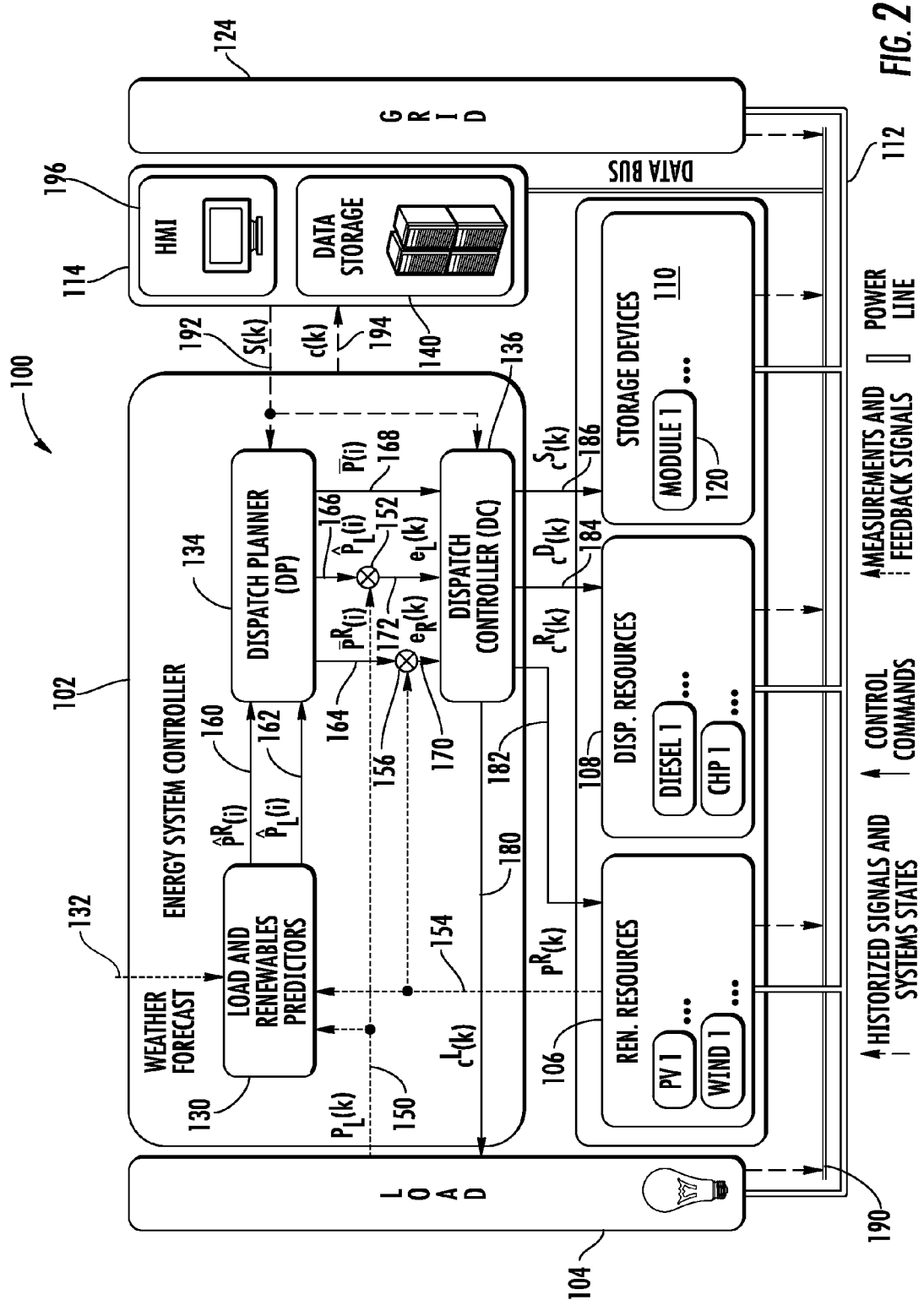
FIG. 2 is a detailed schematic block diagram of the energy system of FIG. 1.

As illustrated in FIG. 2, the control system architecture 100 maximizes the benefits of an energy system with integrated stored energy resources 110, here labeled as energy storage devices 110. One or more energy storage modules 120 are operatively connected to the power line 112 which couples the electrical load 104 to an energy grid 124. The module 120 represents different or similar types of energy storage devices. In addition, the renewable energy resources 106 and the dispatchable energy resources 108 are also coupled to the power line 112. To provide for the distribution of energy from the grid 124 and the resources 106, 108, and 110, energy system controller 102 includes three components or devices that individually and/or collectively solve the tasks of power prediction, power dispatch planning, and execution of power dispatch. A load and renewable predictors module 130 provides for a prediction of the power which is generated by the renewable resources 106 which in different embodiments is dependent upon a weather forecast received at an input 132 to the module 130. A dispatch planner module 134 provides for the planning of the generation and the release or discharge of energy to the load 104. A dispatch controller 136 dispatches or directs the flow of energy provided by the renewable resources 106, the dispatchable resources 108, and the energy stored in the storage devices 110 to the power line 112. Each of the load and renewable predictors module 130 and dispatch planner module 134 are embodied in one embodiment as modules including software resident in the controller 102 or which is one embodiment configured as individual device controllers. In addition, the dispatch controller 136 in one embodiment is embodied as a module including software or as a device controller. While the modules 130, 134 and controller 136 in one embodiment are located at a single predetermined location, each of the modules 130, 134 and controller 136 in other embodiments are remotely located apart from each other if desired.

When the load and renewable predictors module 130, the dispatch planner module 134, and the dispatch controller 136 are integrated into the energy system controller 102, the modules 130, 134, and controller 136 in one embodiment direct the flow of energy and the amount of power available for the load 104 for/from the energy storage devices 110 and from the dispatchable resources 108, and the renewable resources 106 to maximize benefit of the user, which includes a cost benefit and an energy delivery benefit including the amount of electrical power and a time of its delivery.

FIG. 2 illustrates the power line 112 which provides the electrical power connections to the renewable resources 106, the dispatchable resources 108, the energy storage devices 110, and to the electrical grid 124. The energy system controller 102 receives power measurements from the load, a status of renewable and dispatchable resources and storage devices, and receives historized operation and performance data from a data storage unit 140 coupled to the controller 102. In addition, the energy system controller 102 generates power control commands for the renewable resources 106, the dispatchable resources 108, and the storage devices 110.

The controller 102 includes a plurality of inputs to receive measurement and/or status signals. As described above, the input 132 provides weather information to the predictor module 130. The weather information is obtained from any number of providers including commercial weather prediction vendors and the NOAA National Weather Service. An input 150 to the module 130 provides a signal indicative of the present or current power requirement or status of the load 104, which is also provided to a comparator 152 to be described later. An input 154 to the predictor module 130 is received from the renewable resources 106 and provides status information of the amount of power currently being produced by the renewable resources 106. The status information provided by the input 154 is also provided to a comparator 156 to be described later.

Control commands are generated internally by the controller 102. The predictor module 130, for instance, generates signals over first and second predictor module outputs 160 and 162 which are received as inputs by the planner module 134. Similarly, in response to the signals received over the first and second predictor module 130 outputs 160, 162, the planner module 134 generates signals through planner module 134 outputs 164, 166, and 168. The signal at the output 164 is applied to the comparator 156 and combined with the signal at the output 154 generated by the renewable resource 106. The signal at the output 166 is applied to the comparator 152 and combined with the signal generated by the load 104 over the input 150. An output 170 of the comparator 156 is applied as an input to the dispatch controller 136. An output 172 of the comparator 152 is applied as an input to the dispatch controller 136. The dispatch controller 136 includes an output 180 coupled to the load 104, an output 182 coupled to the renewable resources 106, an output 184 coupled to the dispatchable resources 108, and an output 186 coupled to the storage devices 110.

In addition to the feedback and control commands described above, additional control information is transmitted over a data bus 190 coupled to the load 104, the renewable resources 106, the dispatchable resources 108, the storage devices 110, the data storage unit 140, the HMI 196, and the grid 124. The data bus 190, which includes other types of communication channels, transmits data that is used to communicate command signals and variables required for operation of the system 100. The data storage unit 140 stores data and transmits data upon demand from the controller 102. An output 192 from unit 196 is coupled to the controller 102 and an input 194 to the unit 196 is coupled to the controller 102 to receive command signals. A system operator or user accesses and/or manipulates data stored in the data storage unit 140 or data received from the controller 102 over the output 194. A user interface 196 (HMI) enables a user to access information about the state of the system 100, which in one embodiment is stored in the data storage 140 or received over the output 194.

Figure 3:
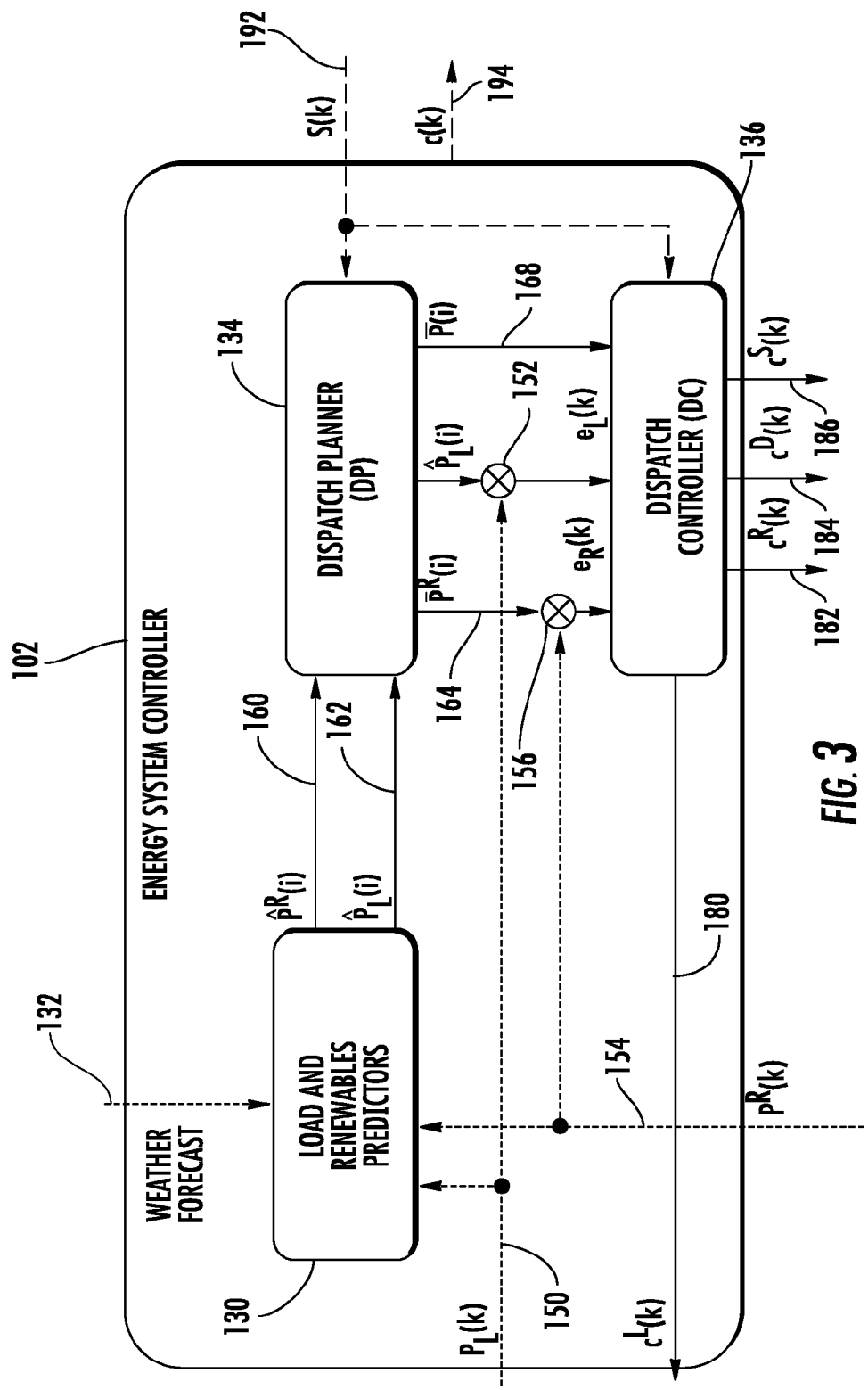
FIG. 3 is a schematic block diagram of an energy system controller of the present invention.

FIG. 3 illustrates a detailed view of the energy system controller 102 and the configuration and types of signals being transmitted internally between the modules 130, 134, and controller 136 and externally to and from the load 104, the resources 106, 108, and 110, and to and from the HMI 196 and data storage unit 140. The load and renewables predictors module 130 generates a prediction of the requirements of the load, $\hat{P}_L(i)$ over the output 162 on a predetermined time horizon, $T_H$, and a prediction of the power to be generated or provided by the renewable resources $\hat{P}^R(i)$ which is transmitted over the output 160 using the same time horizon as used for the load signal at 162. These predictions are transmitted to the dispatch planner module 134 which processes the information and responsively generates a plurality of signals to control the operation of the energy system 100 on the time horizon $T_H$.

The dispatch planner 134 generates baseline power control commands (a vector of reference signals) $\overline{P}(i)$ for the dispatchable resources 108 on the output 168 for transmission to the dispatch controller 136. The dispatch planner module 134 also generates baseline power control commands (a vector of reference signals) for the renewable resources $\overline{P}^R(i)$ over the output 164 which along with the load prediction $\hat{P}_L(i)$, transmitted on the output 166, are compared respectively with the corresponding measurements of the power provided by the renewable resources, $P^R(k)$ at comparator 156, and the load $P_L(k)$ at comparator 152, to generate error signals $e_R(k)$ and $e_L(k)$ respectively. The error signals and the reference signal for the dispatchable resources are then provided to the dispatch controller 136 that computes control commands for transmission to the renewable resources 106 ($c^R(k)$), dispatchable resources 108, ($c^D(k)$), storage devices 110, ($c^S(k)$), and the load 104, ($c^L(k)$). These control commands are provided to individual devices and implemented by the local controllers or a controller in communication with the device. The associated controller controls at least one switch at each of the resources 106, 108, and storage devices 110 to control the release of energy to the power line 112. The error signals indicate a difference between a predicted or planned power values and actual values of the load or power generation of the renewable resources, for instance.

In order to maximize the benefits provided by energy storage devices 110, operation of the energy storage devices 110 is planned on a sufficiently long time horizon, $T_H$, in the future so that the storage devices 110 in one embodiment is charged when energy in the system 100 is most readily available and/or least expensive. In different embodiments, the time horizon includes one or more hours, one or more days, or one or more weeks or other long time horizons. The stored energy is then provided on demand to the load 104 when the energy is most needed or when a predetermined level of savings is achieved if the load is being controlled to reduce load requirements. The dispatch planner module 134 in one embodiment performs an optimized planning of power profiles for the energy storage devices and other energy resources in the system by solving a numerical optimization problem using an optimization program or algorithm resident in firmware or software of the module 130 including memory associated with the module 130. Software resident at the user interface 114 in one embodiment is also used. In one embodiment, the long time horizon extends for one or more weeks, and the time periods used during the longer time horizon vary. For instance, during a first week, determinations of future power used and further power generation are made every hour. During a second week, determinations are made every six hours, and during a third week determinations are made very twelve hours. The determination of time periods in one embodiment is determined based on the accuracy of the weather predictions. When weather predictions are more accurate, for instance during a first week in the future, the determinations are made more often than during a second week in the future when weather predictions become less accurate.

The optimization problem is formulated with a cost function and takes into account the cost of energy, demand charges, battery efficiencies and life to depletion, maintenance and replacement costs for each component of the energy system, and other parameters that influence operating costs of the energy system 100 for a specified time horizon $T_H$. In addition to the cost function, the optimization program takes into account all the constraints imposed on different components of the system such as power limits for various resources, available amounts of energy stored in different energy storage devices, and safety constraints. These algorithms and others described herein in one embodiment are embodied as program code or program instructions in software and/or firmware resident in one of the modules, the controller, in the user interface 114, or remote devices which are coupled to the system 100 through hardwired connections, connections to the internet, or other means of communication to software or firmware either wired or wireless.

To solve the described optimization problem, the dispatch planner module 134 receives a forecasted load profile over the specified time horizon $T_H$, profiles of power that are forecasted to be generated by the renewable resources over the same time horizon, and present states of energy system components such as the amount of fuel available for dispatchable resources and the amount of energy available from various storage devices. Information about the states of components of the energy system is provided to the dispatch planner module 134 by signal S(k) over the output 192 from data storage unit 140 of FIG. 2. Information indicative of the future load profile and power profiles from renewable resources 106 is provided to the dispatch planner module 134 by the load 104 and renewables predictors module 130.

Since at any given instant of time, the future load profiles of the load 104 and the future power profiles available from the renewable resources 106 are unknown, such profiles are forecasted. The load and renewables predictors module 130 includes a number of predictor algorithms that generate forecasts of the future load requirements of load 104 and the power anticipated to be available from renewable resources 106 on the prediction time horizon $T_H$. For example in an energy system 100 having one load connection, one photovoltaic (PV) installation, (typically including large arrays of PV cells), and one wind turbine, three predictors are provided for each one of these components. Each of these predictors is represented by a mathematical model of the considered component (e.g. load, PV installation, wind turbine) and models of physical processes that influence power consumption or generation of a given component. The predictor module 130 receives measurements of the power available from or provided to the component as well as other inputs that influence the power profile and generates a prediction of the power profile. These predictions are provided to the dispatch planner module 134 in the form of signals $\hat{P}_L(i)$ for the load 104 and $\hat{P}^R(i)$ for the renewable resources 106.

For example, the load predictor module 130 in one embodiment is implemented with a neural network model of the load 104 that is populated or trained with historical load profiles of the energy system 100 and is capable of generating a forecast of the load 104 which occurs in the future on a timeline horizon of several hours or one or more days. In one example for instance, power requirements of a load are predicted based on power usage during a workweek as opposed to power usage during a weekend. Neural networks are known and are used in one embodiment.

The load predictor module 130 in one embodiment utilizes past measurements of the load power requirements as well as other variables such as current and future time variables, day of the week, time of the year, weather forecast on the specified time future horizon and other variables to generate the prediction $\hat{P}_L(i)$. A predictor algorithm for the PV installation in one embodiment is embodied by in program code providing a deterministic model that computes solar irradiance at a given geographical location for any time of the day and year which is adjusted by a weather forecast predicting cloud cover, humidity and other atmospheric parameters for time $T_H$ in the future. The solar irradiance is considered in one embodiment as a part of the weather forecast. The power provided by the PV installation is determined than from the solar irradiance utilizing the mathematical model mapping irradiance into the power output. Similarly, the wind power predictor in one embodiment utilizes a mathematical model of the installed wind turbine along with the weather forecasts about temperature, humidity, wind speed and direction for the next time horizon $T_H$. Signal $P^R(k)$ provides information about the power generation by renewable resources at time instant k that is used by the predictors of the renewable power.

In one embodiment, a dispatch strategy computed by the dispatch planner module 134 relies on the prediction of load 104 and power available from the renewable resources 106. Due to prediction uncertainties and errors, modeling inaccuracies, and temporal variations in load profiles, and renewable profiles, a mismatch in one embodiment occurs between the predicted load and power profiles and the true load and power profiles. In addition to that mismatch, since both the predictors module 130 and dispatch planner module 134 need time to compute the predictions and the optimal dispatch strategy for the next time horizon, the predictors module 130 and dispatch planner module 134 of the energy system controller 102 in one embodiment operate at a sampling rate less than the speed required to compensate for an instantaneous variation of load demand and power supply. To compensate for the potentially faster variations of load demand and power supply from the renewable resources, the control system incorporates the dispatch controller 136. The dispatch controller 136 uses optimally planned profiles generated by the dispatch planner module 134 as reference inputs, and computes the errors, $e_R(k)$ and $e_L(k)$, between the predicted profiles and the measurements collected at a high sampling rate, and generates final command inputs to the energy system resources. In one embodiment, the predictors module 130 and the dispatch planner module 134 operate at a sampling rate of approximately between 15 minutes and 1 hour. This sampling rate is limited by the update rate of forecasts for the load 104 and renewable resources 106 and by the amount of time required to perform the optimization.

To compensate for the errors which accumulate due to prediction inaccuracies and temporal variations, the dispatch controller 136 compares reference inputs from the dispatch planner with the measurements received from the load $P_L(k)$ and renewable resources $P^R(k)$, computes the corresponding errors $e_L(k)$, $e_R(k)$ and augments reference commands from the dispatch planner module 134 with correction signals to generate power commands $c^D(k)$ to dispatchable resources 108, power commands $c^S(k)$ storage devices 110, throttling commands $c^R(k)$ to renewable resources 106 and, if load devices allow demand management, load regulation commands $c^L(k)$ to the load 104. In one embodiment command signals generated by the dispatch controller 136 are computed by augmenting the reference signals received from the dispatch planner module 134 with corrections that constitute fractions of the combined error, $e(k)=\Sigma e_R(k)-\Sigma e_L(k)$.

The throttling commands are generated in situations when the renewable resources 106 provide or are providing more power at a given sample time k than the amount of power than is capable of being absorbed by the load 104, storage devices 110 or the dispatchable resources 108. The throttling commands are transmitted to the renewable resources 106 to reduce the amount of energy being generated by the renewable resources. In the case of the PV arrays, in one embodiment the alignment of the arrays with respect to the sun are adjusted to misalign the arrays with respect to the path of sunlight, or in another embodiment the connection to the power line 112 is disconnected. In the case of wind turbines and in different embodiments, the blade angle is adjusted to limit the amount of rotation or the blades are disconnected from the gearbox or generator.

The sampling time for the dispatch controller 136 is denoted by k, while the sampling time for the predictors module 130 and the dispatch planner module 134 are denoted by i. This distinction is made to indicate that the sampling rate of the predictors module 130 and dispatch planner module 134 is slower than the faster sampling rate of the dispatch controller 136. In one embodiment, the sampling rate of the dispatch controller 136 is on the order of fractions of a minute to several seconds, milliseconds or other short time intervals. This sampling rate is limited by the sampling rates of the measurement devices acquiring instantaneous power of the load and the Renewable resources and the amount of time required to generate the control commands $c^R(k)$, $c^D(k)$, $c^S(k)$, $c^L(k)$.

The dispatchable energy resources 108 provide energy at times when the renewable energy resources 106, stored energy resources 110 are insufficient to meet the energy requirements of the load 104. In one embodiment, the dispatchable energy resource 108 provides a load matching function to provide an output to match the shape of the load demand. In another embodiment, peak matching is also provided to match the highest energy demand occurring during a certain time of day. Such time is predicted based on time of day, pattern of energy use, weather, and geographic location. The dispatchable energy resource 108 in other embodiments also cover lead-in times where some resources, such as coal powered plants, take a certain amount of time to ramp up to the desired output. Frequency regulation is also provided in some embodiments.

The control system architecture 100 facilitates robust operation in the presence of potential problems or failures in individual system components. For example, in one embodiment each one of the three modules 130, 134, and the controller 136 are implemented on an individual processor, server, programmable logic controller (PLC) or another computing device such that when one of these modules or controllers fail, one or more of the other modules or controller continue operation. In one embodiment, when each of the three components 130, 134, and 136 of the control system are implemented on the same device, as hardware, firmware or software, each is implemented as individual devices or programs, or program code, running independently and exchanging information between each other according to the described invention in order to provide the robust operation, such that power continues to be supplied if one of the components fails. In one embodiment, each of the components 130, 134, and 136 are independent of the other to provide for the failure of one or more of the other components.

If, for example, the predictors module 130 does not receive a weather update or fails to provide a new prediction at a certain time, the dispatch planner module 134 uses the predictions stored in an associated memory, or stored in the data storage 140, from the previous forecast, extrapolate it one step further according to a chosen rule, and generate a set of new reference signals for the dispatch controller 136. Such operation continues until the predictors module 130 restores its functionality and starts providing the forecast again. In this situation, the operation of the energy system 100 deviates from an optimal operation, but the controller 102 continues to reliably coordinate the transfer of power between the load 104 and the resources 106, 108, and 110. In another embodiment, if the dispatch planner module 134 fails, the dispatch controller 136 uses the planned profiles received from the dispatch planner module 134 during the previous time step and continue control of the system power until the planner module 134 operation is restored. In another embodiment, if the predictors module 130 or the dispatch planner module 134 fails for a sufficiently long period of time, longer than the prediction horizon of several hours or days, the dispatch controller 136 resorts to a logic-based control of the power transmission until full functionality of the controller 102 is restored.

In terms of reliable operation of the energy system 100, a significant component of the control architecture is the dispatch controller 136. In general and in one embodiment, the control system controls power flow between the energy system resources as long as the dispatch controller 136 continues to be operational.

While the invention has been illustrated and described in detail in the drawings and foregoing description, the same should be considered as illustrative and not restrictive in character. While it is understood that only the certain embodiments have been presented, any and all changes, modifications and further applications that come within the spirit of the invention are desired to be protected.

What is claimed is:

1. An energy control system configured to control the transmission of energy to an electrical load comprising:
   a renewable energy resource;
   a stored energy resource;
   a memory configured to store program instructions; and
   an energy system controller operably coupled to the renewable energy resource, to the stored energy resource, and to the memory, the energy system controller configured to execute the stored program instructions to:
     predict (i) an energy requirement of the electrical load over a first time horizon that extends for a first time duration and (ii) an energy generation of the renewable energy resource over the first time horizon;
     generate (i) an optimally planned power profile for the renewable energy resource over the first time horizon based on the predicted energy requirement and the predicted energy generation and (ii) an optimally planned power profile for the stored energy resource over the first time horizon based on the predicted energy requirement and the predicted energy generation;
     determine (i) an energy requirement error value by determining a difference between the predicted energy requirement and an actual energy requirement of the electrical load over a second time horizon that extends for a second time duration that is less than the first time duration of the first time horizon, and (ii) an energy generation error value by determining a difference between the predicted energy generation and an actual energy generation of the renewable energy resource over the second time horizon; and
     control (i) a throttling of the renewable energy resource based on the planned power profile for the renewable energy resource, the energy requirement error value, and the energy generation error value, and (ii) a charging and discharging of the stored energy resource based on the planned power profile for the stored energy resource, the energy requirement error value, and the energy generation error value.

2. The energy control system of claim 1 further comprising:
   a dispatchable energy resource operably coupled to the energy system controller,
   wherein the energy system controller is configured to further execute a stored program instruction to:

generate an optimally planned power profile for the dispatchable energy resource over the first time horizon based on the predicted energy requirement and the predicted energy generation; and control an energy output of the dispatchable energy resource based on the planned power profile of the dispatchable energy resource, the energy requirement error value, and the energy generation error value.

3. The energy control system of claim 2, wherein the energy system controller comprises a predictor module configured to:

receive a weather forecast indicative of the future occurrence of a weather pattern over the first time horizon; and predict the energy requirement of the electrical load and the energy generation of the renewable energy resource based on the weather forecast.

4. The energy control system of claim 3, wherein the energy system controller further comprises a dispatch planner module operatively coupled to the predictor module and configured to:

receive the predicted energy requirement and predicted energy generation from the predictor module;

generate the planned power profiles for the renewable energy resource, the stored energy resource, and the dispatchable energy resource; and provide baseline control commands based on the planned power profiles for the renewable energy resource, the stored energy resource, and the dispatchable energy resource.

5. The energy control system of claim 4, wherein the energy system controller further comprises a dispatch module operatively coupled to the dispatch planner module and configured to:

receive the baseline control commands from the dispatch planner module; and control (i) the throttling of the renewable energy resource, the charging and discharging of the stored energy resource, and the power output of the dispatchable energy resource by modifying the baseline control commands for the renewable energy resource, the stored energy resource, and the dispatchable energy resource.

6. The energy control system of claim 3, wherein the weather forecast indicative of the future occurrence of a weather pattern includes at least one of solar irradiance, cloud cover, humidity, and wind speed and direction.

7. The energy control system of claim 1, wherein the renewable energy resource comprises at least one of a photovoltaic installation, a wind turbine, a biomass plant, a hydroelectric power plant, a geothermal power installation, a tidal power installation, and a wave power installation.

8. The energy control system of claim 1, wherein the first time horizon is on the order of at least one of a day and a week.

9. The energy control system of claim 1, wherein the second time horizon is on the order of at least one of a second, a minute and an hour.

10. The energy control system of claim 1, wherein the renewable energy resource comprises a photovoltaic installation.

11. The energy control system of claim 10, wherein the energy system controller comprises a predictor module configured to:

receive a weather forecast indicative of the future occurrence of a weather pattern over the first time horizon; and predict the energy requirement of the electrical load and the energy generation of the renewable energy resource based on the weather forecast.

12. The energy control system of claim 11, wherein the energy system controller further comprises a dispatch planner module operatively coupled to the predictor module and configured to:

receive the predicted energy requirement and predicted energy generation from the predictor module;

generate the planned power profiles for the renewable energy resource, the stored energy resource, and the dispatchable energy resource; and provide baseline control commands based on the planned power profiles for the renewable energy resource, the stored energy resource, and the dispatchable energy resource.

13. The energy control system of claim 12, wherein the energy system controller further comprises a dispatch module operatively coupled to the dispatch planner module and configured to:

receive the baseline control commands from the dispatch planner module; and control (i) the throttling of the renewable energy resource, the charging and discharging of the stored energy resource, and the power output of the dispatchable energy resource by modifying the baseline control commands for the renewable energy resource, the stored energy resource, and the dispatchable energy resource.

14. A method for controlling the transmission of energy between an electrical load, a renewable energy resource, and a stored energy resource comprising:

predicting (i) an energy requirement of the electrical load over a first time horizon that extends for a first time duration and (ii) an energy generation of the renewable energy resource over the first time horizon;

generating (i) an optimally planned power profile for the renewable energy resource over the first time horizon based on the predicted energy requirement and the predicted energy generation and (ii) an optimally planned power profile for the stored energy resource over the first time horizon based on the predicted energy requirement and the predicted energy generation;

determining (i) an energy requirement error value by determining a difference between the predicted energy requirement and an actual energy requirement of the electrical load over a second time horizon that extends for a second time duration that is less than the first time duration of the first time horizon, and (ii) an energy generation error value by determining a difference between the predicted energy generation and an actual energy generation of the renewable energy resource over the second time horizon; and controlling (i) a throttling of the renewable energy resource based on the planned power profile for the renewable energy resource, the energy requirement error value, and the energy generation error value, and (ii) a charging and discharging of the stored energy resource based on the planned power profile for the stored energy resource, the energy requirement error value, and the energy generation error value.

15. The method of claim 14 further comprising:

generating an optimally planned power profile for the dispatchable energy resource over the first time horizon based on the predicted energy requirement and the predicted energy generation; and controlling an energy output of the dispatchable energy resource based on the planned power profile of the dispatchable energy resource, the energy requirement error value, and the energy generation error value.

16. The method of claim 15 further comprising:
receiving, with a predictor module, a weather forecast indicative of the future occurrence of a weather pattern over the first time horizon; and
predict, with the predictor module, the energy requirement of the electrical load and the energy generation of the renewable energy resource based on the weather forecast.

17. The method of claim 16 further comprising:
receiving, with a dispatch planner module, the predicted energy requirement and predicted energy generation from the predictor module;
generating, with the dispatch planner module, the planned power profiles for the renewable energy resource, the stored energy resource, and the dispatchable energy resource; and
provide, with the dispatch planner module, baseline control commands based on the planned power profiles for the renewable energy resource, the stored energy resource, and the dispatchable energy resource.

18. The method of claim 17 further comprising:
receiving, with a dispatch module, the baseline control commands from the dispatch planner module; and
controlling, with the dispatch module, (i) the throttling of the renewable energy resource, the charging and discharging of the stored energy resource, and the power output of the dispatchable energy resource by modifying the baseline control commands for the renewable energy resource, the stored energy resource, and the dispatchable energy resource.

19. The method of claim 18, wherein the predicting of the energy generation of the renewable energy resource over the first time horizon includes predicting energy to be generated by a at least one of a photovoltaic array, a wind turbine, a hydroelectric power plant, a tidal power installation, and a wave power installation.

20. The method of claim 16, wherein the receiving of the the weather forecast indicative of the future occurrence of a weather pattern over the first time horizon includes receiving at least one of solar irradiance, cloud cover, humidity, and wind speed and direction.

21. The method of claim 14, wherein the first time horizon is on the order of at least one of a day and a week.

22. The method of claim 14, wherein the second time horizon is on the order of at least one of a second, a minute and an hour.

* * * * *